Jan. 15, 1957  O. V. MARKLEY  2,777,153
GATE CLOSER

Filed June 28, 1954  2 Sheets-Sheet 1

Olin V. Markley
INVENTOR.

BY
Attorneys

Jan. 15, 1957     O. V. MARKLEY     2,777,153
GATE CLOSER

Filed June 28, 1954     2 Sheets-Sheet 2

Olin V. Markley
INVENTOR.

United States Patent Office 2,777,153
Patented Jan. 15, 1957

2,777,153

GATE CLOSER

Olin V. Markley, Aurora, Colo.

Application June 28, 1954, Serial No. 439,606

2 Claims. (Cl. 16—65)

The present invention relates to new and useful improvements in self-closing gates to automatically close the gate when the same is opened in either direction.

An important object of the invention is to provide a pair of opposing springs arranged to subject the gate to spring tension when opened in either direction to return the gate to a closed position.

Another object is to provide a pair of swingable arms mounted on a fence post to engage opposite sides of the gate and actuated by the respective springs in a gate closing movement.

A further object is to provide a gate closing attachment adapted for mounting as a unitary structure on a fence post and without necessitating any changes or alterations in the fence post or gate.

A still further object is to provide a device of this character of simple and practical construction, which is efficient and reliable in operation, strong and durable, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
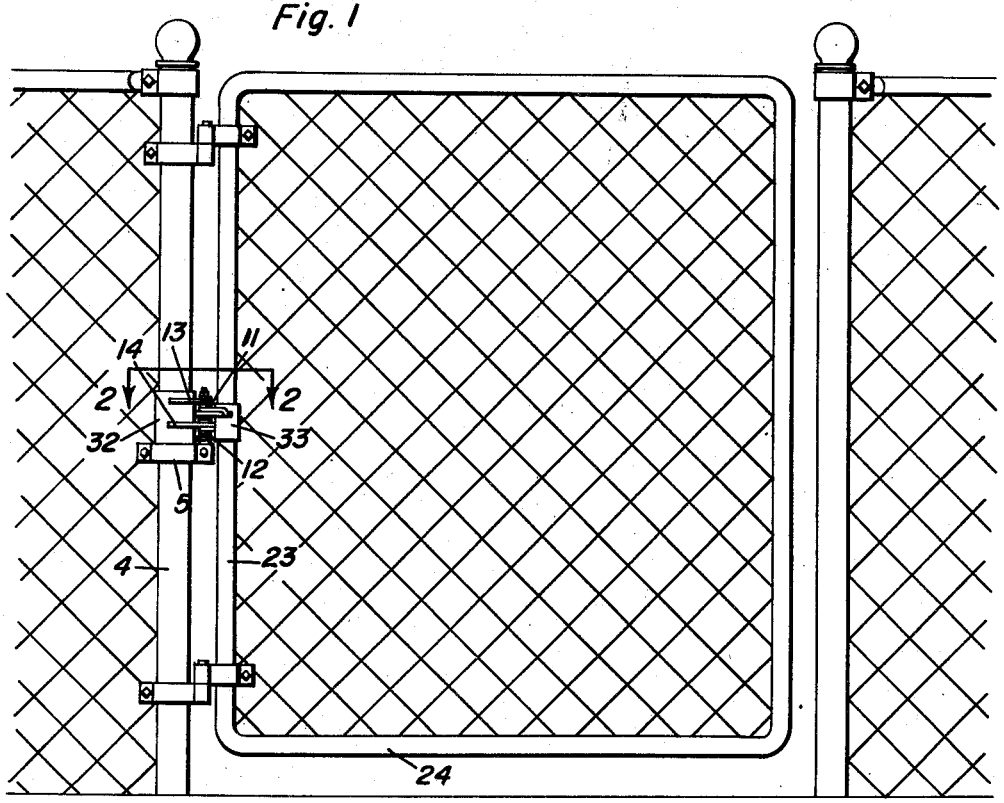
Figure 1 is a view in elevation of a gate equipped with a gate closer embodying my invention.

Referring now to the drawings in detail, wherein for the purpose of illustration, I have disclosed a preferred embodiment of my invention, the numerals 5 and 6 designate a pair of coacting arcuate clamping sections forming a clamping collar, and each section is provided with confronting flanges 7 for securing the sections in clamping engagement on a metal fence post 4 by bolts and nuts 8. The flange of one section is sufficiently enlarged, as shown at 9, to support an upstanding pintle 10 suitably fixed thereto and on which upper and lower coil springs 11 and 12 are mounted and between which upper and lower arms 13 and 14 are positioned and formed with openings 15 and 16 respectively at their central portions for swingably mounting the arms on the pintle. Spacing washers 17 are suitably interposed between the superposed springs and arms and the springs, arms and washers are secured in assembled relation on the pintle to rest on the enlarged flange 9 by a nut 18 threaded on the upper end of the pintle.

The end portions 19 and 20 of upper arm 13 are concaved or curved in opposite directions, and the end portions 21 and 22 of lower arm 14 are likewise concaved or curved in opposite directions and arranged with the concavities of end portions 19 and 21 opposing each other to bear against diametrically opposite sides of fence post 4 and with the concavities of end portions 20 and 22 of the arms also opposing each other to bear against diametrically opposite sides of the adjacent vertical frame member 23 of a gate 24 which is hingedly mounted on the post and with the pintle 10 in alignment with the hinge axis of the gate.

The upper coil spring 11 has a radially projecting end portion 25 which engages the post at a point diametrically opposite to end portion 19 of upper arm 13, and the spring 11 also has a second radially projecting end portion 26 which is formed with a hook 27 for engaging behind the opposite end portion 20 of arm 13. Lower coil spring 12 likewise includes radially projecting end portions 28 and 29 which respectively engage post 4 and end portion 22 of lower arm 14 in a manner similar to the upper spring and upper arm and arranged with the upper and lower springs tensionally opposing each other.

Figure 2:
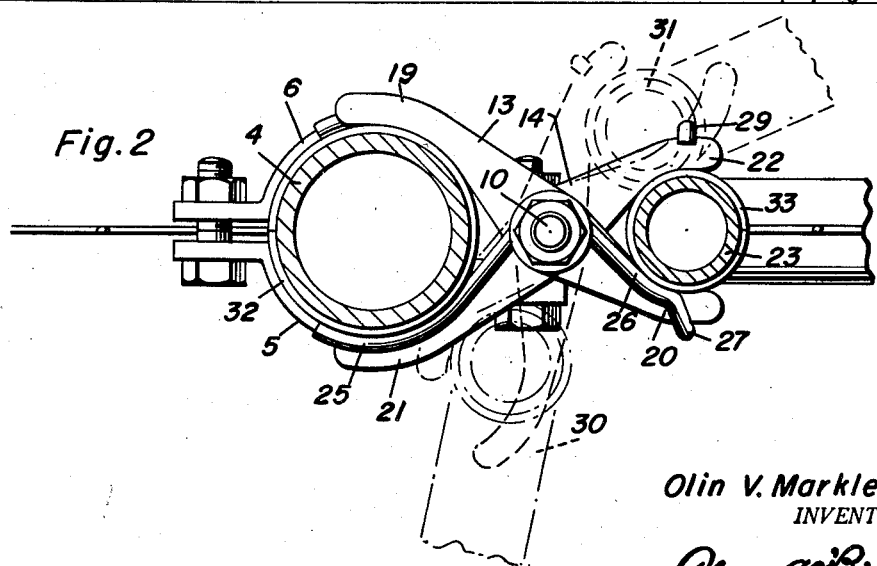
Figure 2 is an enlarged sectional view taken on a line 2—2 of Figure 1.
Figure 3:
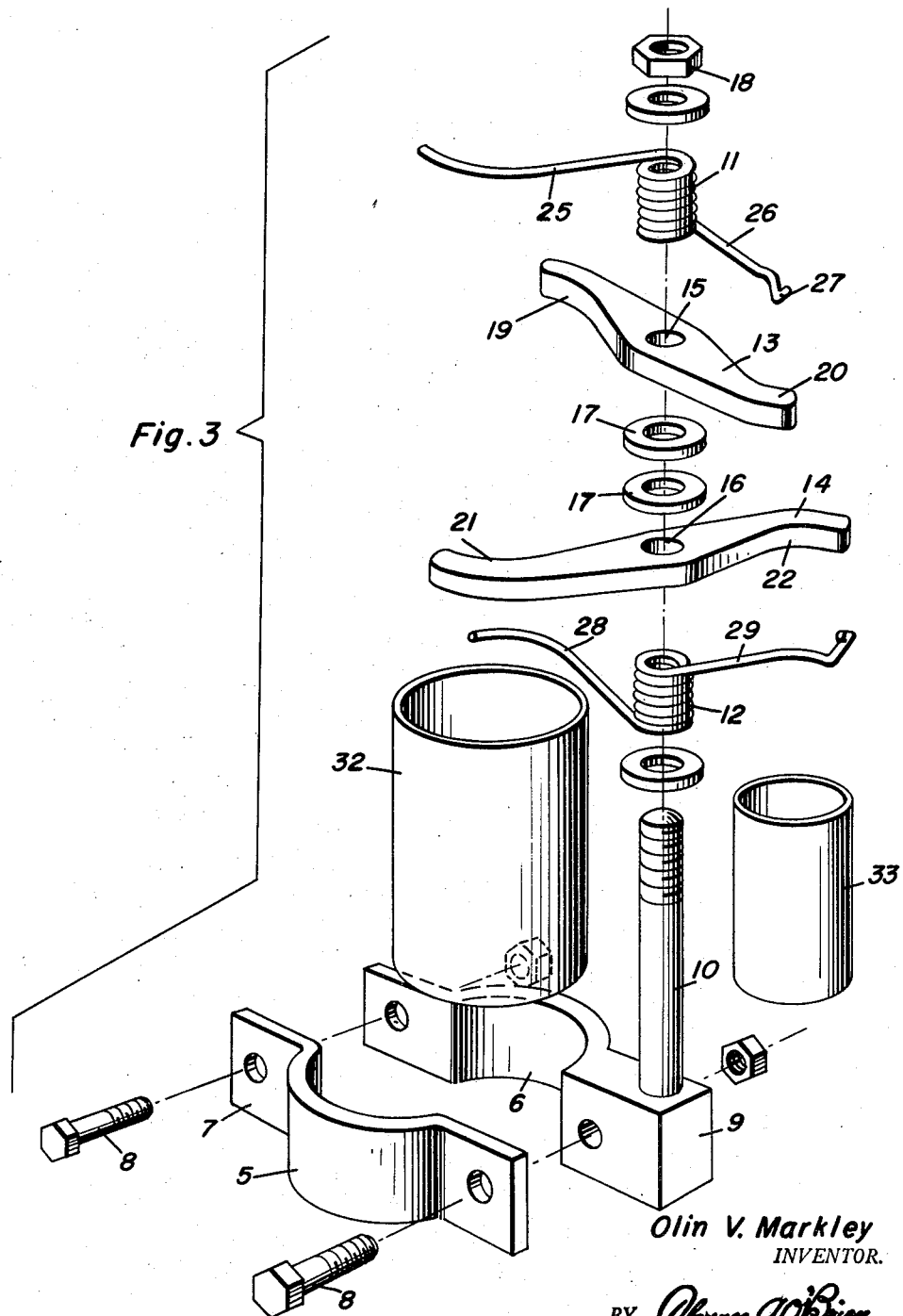
Figure 3 is an enlarged exploded perspective view of my gate closer.

In the operation of the device, when gate 24 is opened in one direction, as indicated by dotted lines 30 in Figure 2, tension on upper spring 11 will be increased, while tension on lower spring 12 is decreased, and accordingly, when the gate is released, the spring which has been subjected to the greater tension will close the gate until the tension of the two springs has become equalized, whereupon the gate will be held in its normal closed position. A similar action will affect lower spring 12 when the gate is opened in an opposite direction, as shown by the dotted lines 31 in Figure 2.

Bumper sleeves 32 and 33 of rubber or other suitable material may be placed on post 4 and frame member 23 of the gate for contact by the arms during closing of the gate.

What is claimed as new is as follows:

1. An automatic gate closer comprising a device adapted for attachment to a supporting structure adjacent the hinged edge of a gate and including a vertical pin positioned in spaced relation between the structure and the gate, a pair of arms swingably mounted at their central portions on the pin in crossed arrangement to engage the opposite end portions of each arm with both the supporting structure and the gate in an opposing relation with respect to the movement of the gate in either direction, spring means tensionally urging the arms in engagement with the gate, and resilient bumpers positioned on the supporting structure as well as on the gate for contact by the arms.

2. A gate closer comprising an attaching member adapted for attaching to a supporting structure adjacent the hinged edge of a gate, a vertical pin on the attaching member in vertical alignment with the hinge axis of the gate, a pair of arms pivoted on the pin in crossed relation to each other and arranged with the opposite end portions of each arm engaging both the supporting structure and the gate in opposing relation with respect to the movement of the gate in either direction, and coil spring means on said pin and positioned in biasing engagement between the supporting structure and each arm to actuate the arms toward a gate closing position and including biased outwardly projecting portions engaging said arms and yieldingly opposing movement of the gate in either direction.

References Cited in the file of this patent
UNITED STATES PATENTS 2,587,287   Chamberlain _____ Feb. 26, 1952